(12) United States Patent
Au et al.

(10) Patent No.: US 6,442,534 B1
(45) Date of Patent: Aug. 27, 2002

(54) HYDRAULIC CONTROLLER USING MULTIPLE REGIME SPECIFIC CONTROLLERS COMBINED WITH FUZZY LOGIC

(75) Inventors: Burton K. Au, Solon, OH (US); Petr Horacek, Prague (CZ); Miroslav Kes, Veseli nad Luznici (CZ); Bohumir Sladek, Milevsko (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/256,836

(22) Filed: Feb. 23, 1999

(51) Int. Cl.[7] .................................................. G06N 7/02
(52) U.S. Cl. ............................... 706/1; 706/3; 700/37; 700/41; 700/44
(58) Field of Search ............................ 310/80; 318/610; 369/32; 700/37, 41, 44; 706/3, 1

(56) References Cited

U.S. PATENT DOCUMENTS

| | | | |
|---|---|---|---|
| 4,362,978 A | * 12/1982 | Pollard et al. | 700/260 |
| 5,159,547 A | * 10/1992 | Chand | 700/37 |
| 5,394,678 A | * 3/1995 | Lonn et al. | 56/10.2 H |
| 5,497,063 A | * 3/1996 | Day et al. | 318/610 |
| 5,557,154 A | * 9/1996 | Erhart | 310/80 |
| 5,566,065 A | * 10/1996 | Hansen et al. | 700/44 |
| 5,570,282 A | * 10/1996 | Hansen et al. | 700/41 |
| 5,822,740 A | * 10/1998 | Haissig et al. | 706/3 |
| 5,867,456 A | * 2/1999 | Tsai et al. | 369/32 |

OTHER PUBLICATIONS

Jackson, A., Fuzzy logic vs traditional approaches to the design of microcontroller–based systems, Aerospace Applications Conference, 1994. Proceedings., 1994 IEEE, Feb. 5–12, 1994, pp.: 19–33.*

Malki, H.A.; Huaidong Li; Guanrong Chen, New design and stability analysis of fuzzy proportional–derivative control systems, Fuzzy Systems, IEEE Transactions on, vol.: 2 4, Nov. 1994, pp.: 245–254.*

Thaler, George J. et al, Servomechanism Analysis, Mcgraw–Hill Book Company, Inc., New York, 1953, pp. 337–349. Feb. 1994.*

* cited by examiner

Primary Examiner—Wilbert L. Starks, Jr.
(74) Attorney, Agent, or Firm—Adam J. Forman; Alexander M. Gerasimow; William R. Walbrun

(57) ABSTRACT

A control system for an actuator employs a number of discrete feedback controllers each tuned to different operating conditions or parameters. The competing outputs of the feedback controllers are combined using fuzzy logic which dynamically effects a combination depending on the output values. One set of rules in the preferred embodiment gives greater weighting to the output having relatively lower effect on the control process.

9 Claims, 3 Drawing Sheets

HYDRAULIC CONTROLLER USING MULTIPLE REGIME SPECIFIC CONTROLLERS COMBINED WITH FUZZY LOGIC

CROSS REFERENCE TO RELATED APPLICATIONS

STATEMENT REGARDING FEDERALLY SPONSORED RESEARCH OR DEVELOPMENT

BACKGROUND OF THE INVENTION

The invention relates to feedback controllers for hydraulic and pneumatic actuators and in particular to a control system employing multiple feedback controllers each tuned to different operating conditions of the actuator and combined using fuzzy logic.

Feedback controllers, such as those which may be used to control an hydraulic or pneumatic actuator, accept a reference signal (i.e., a position command indicating the desired position of the actuator) and receive a feedback signal (i.e., a signal indicating the actual position of the actuator). From these signals, the feedback controller produces a command signal to the actuator calculated to bring the feedback signal into closer agreement with the reference input. For hydraulic and pneumatic actuators, the reference signal may be either position or force.

In a "proportional-integral-derivative" (PID) controller, a feedback signal is subtracted from the reference input to produce an error signal. Three signals are generated from the error signal: (1) a signal that is proportional to this error signal, (2) a signal that is the integral of this error signal, and (3) a signal that is the derivative of this error signal. Each of these three signals is given a different weight and then summed.

As is well understood in the art, the weighting of the proportional, integral and derivative signals is adjusted by the user to tune the PID controller to provide different control characteristics having benefits for different operating regimes of the actuator. For example, the controller may be tuned to produce reduced steady state error, reduced overshoot, reduced response time or the like. If the transfer function of the physical system to be controlled is well-known and may be approximated by a linear system, the approximate P, I and D gain factors may be calculated according to desired tradeoffs by a number of well-known methods. Inevitably, however, such tuned PID controllers compromise between the particular goals, for example, response time and overshoot.

Further, the transfer function of the physical system may not be well-known, as a result for example, of changing the load connected to the actuator. Practical tuning of the feedback controller in this case necessarily is limited to a typical or average transfer function.

Fuzzy logic is a well-known technique for controlling mathematically illunderstood processes. In fuzzy logic, input quantities are mapped to several fuzzy states defined by overlapping membership functions. If the input quantity is pressure, for example, the membership function might map it to the fuzzy states of: "low pressure", "medium pressure" and "high pressure" to varying degrees. Fuzzy rules approximating rules applied by human experts may then be applied to fuzzy states to map the characterized inputs to output states. Competing output states resulting from the overlap of the membership functions and the rules are then combined in a third "defuzzifying" step according to one of several methodologies. A common method of combining output membership functions is to find their center of mass.

BRIEF SUMMARY OF THE INVENTION

The present invention employs the power of fuzzy logic in combining competing output values, to combine the output values of different feedback controllers each tuned to a different operating regime of an actuator. In this way separately tuned feedback controllers may address not only different operating regimes of the actuator but may also accommodate a range of operating conditions, for example, loads or the like. Individual and separately tunable feedback controllers allowed the overall control strategy to be built up using intuitive and well understood parts.

Specifically the present invention provides a control system for an actuator of a type receiving a command signal causing actuation of the hydraulic actuator and providing at least one feedback signal indicating resulting actuation of the hydraulic actuator. The control system includes a first feedback controller receiving a first feedback signal and tuned for first operating condition of the actuator and providing a first output signal, and a second feedback controller receiving a second feedback signal and tuned for a second operating condition of the actuator different from the first operating condition and providing a second output signal. A fuzzy logic circuit receives and combines the first and second output signals according to fuzzy logic rules to produce the command output for the hydraulic actuator.

Thus, it is one object of the invention to allow multiple, low-complexity feedback controllers to be combined to operate an actuator under different regimes for which it would be hard to tune a single feedback controller. The fuzzy logic rules may combine the first output signal and the second output signal based on their relative values. This principle can be extended to outputs of more than two controllers and/or combinations of outputs of individual controllers.

Thus it is another object of the invention to provide for a combination of outputs of multiple feedback controllers using rules based solely on the output from the feedback controller and not requiring access to other information.

The outputs of the first and second feedback controllers may be formed into a ratio used to combine the first and second outputs into a control output. More specifically, the combination may be such that the lesser of the first and second outputs has the greater weight in the combination.

Thus it is another object of the invention to incorporate in the combination an overarching rule that the feedback controller, providing for a lesser magnitude of control output to the actuator, predominates in the control process. This rule reflects the observation that the better-tuned feedback controller for the particular operating condition requires least perturbation of the actuator.

The first feedback controller and the second feedback controller may be proportional-integral-derivative controllers and the fuzzy logic rules may disable the integral portion of a given feedback controller when the contribution of the output of the given feedback controller is less than a predetermined amount of the command signal.

Thus it is another object of the invention to prevent "windup" of the controller whose output is not used such as would cause a continued error signal to increase the amount of the integral term of that controller. When the particular controller is de-emphasized in the control equation, its integral term is likewise disabled or reduced.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

DETAILED DESCRIPTION OF THE INVENTION

Figure 1:
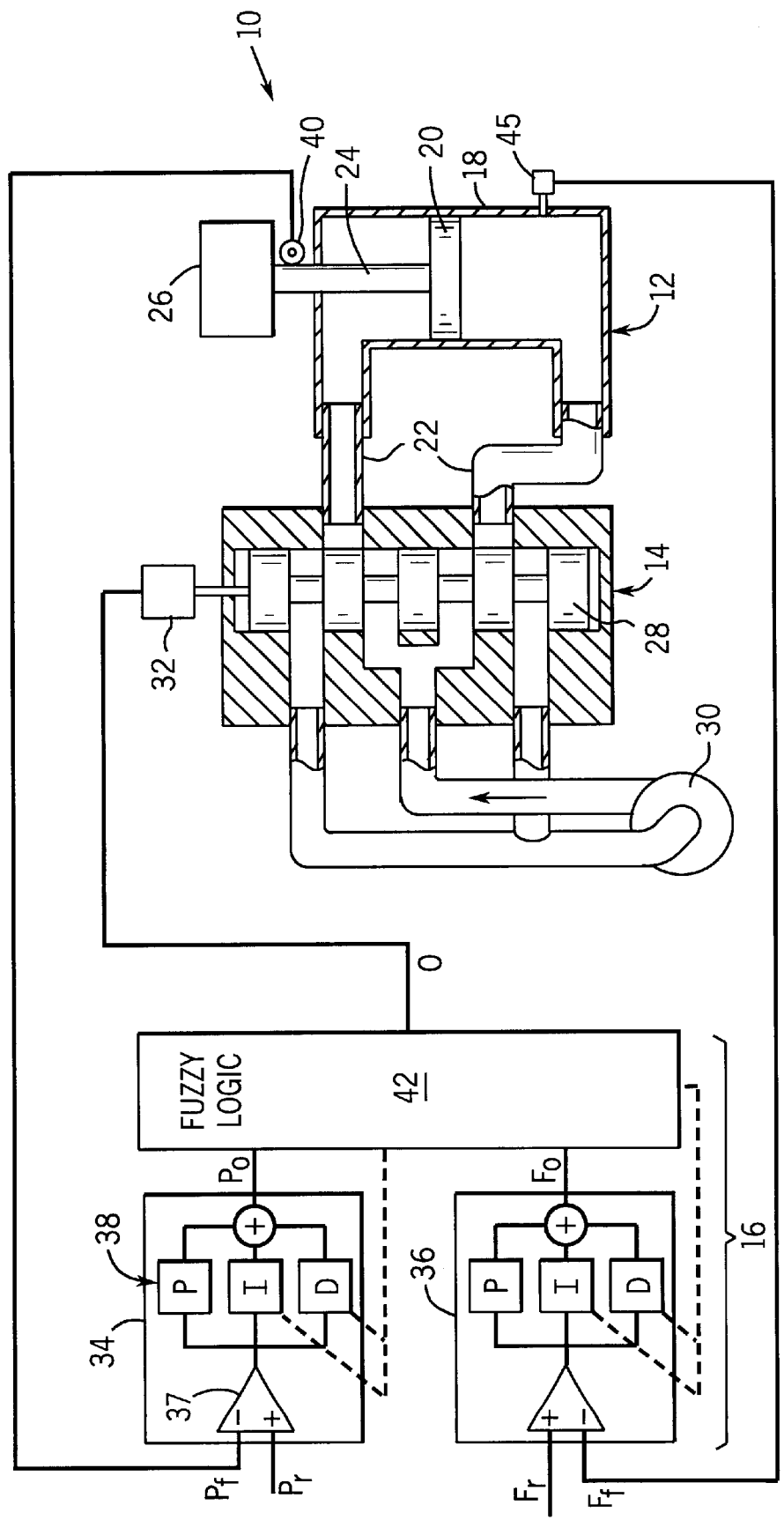
FIG. 1 is a block diagram of an hydraulic actuator as controlled by two feedback controllers whose outputs are combined by a fuzzy logic unit according to the present invention.

Referring now to FIG. 1, an hydraulic controller 10 includes an hydraulic cylinder 12, and a valve assembly 14 providing hydraulic fluid to the hydraulic cylinder 12, and a control system 16 receiving pressure and force reference signals $P_r$ and $F_r$ to provide an output O controlling the valve assembly 14.

The hydraulic cylinder 12 provides a cylindrical chamber 18 holding a piston 20 within the chamber, the piston 20 slidably engaging the inner walls of the cylindrical chamber 18 so as to move along the cylinder's axis between a first and second port 22 in the chamber 18. An actuator arm 24 connected to the piston 20 extends outside of the chamber 18 through a seal to connect with a mass 26 representing generally the load which the hydraulic cylinder 12 is intended to move. Although the mass 26 is shown as fixed and directly connected to the actuator arm 24, more typically the mass 26 will vary during operation of the hydraulic cylinder 12, for example, if the hydraulic cylinder 12 is part of an assembly engaging and disengaging with actuated components or if the mass 26 is fixed but connected through levers so as to effectively change the loading on the actuator arm 24 with its movement.

The interior of the chamber 18 is filled with an hydraulic fluid (not shown for clarity) which may pass into and out of the chamber 18 through the ports 22. The ports 22 connect to corresponding ports in the valve assembly which is a standard hydraulic valve having a movable spool 28 directing pressurized hydraulic fluid from pump 30 into the first port 22 and out of the second port 22 for movement of the piston 20 in the first direction or in the opposite manner so as to move the piston 20 in the opposite direction according to the position of the spool. The spool 28 may be moved by a relatively low-force actuator 32 which may be a secondary hydraulic circuit or an electromagnetic actuator such as are well-known in the art. Control of the actuator 32 is provided by an electrical output signal O obtained from the control system 16.

In the first embodiment, the control system 16 includes a first and second proportional-integral-differential control block (PID control block 34 and 36, respectively). As is understood in the art, each PID control block 34 and 36 includes a differential input 37 providing an error signal at its output which is provided to P, I and D gain blocks 38 which provide respectively: (1) the error signal times the proportional gain factor ("P-gain"), (2) the integral of the error signal times an integral gain factor ("I-gain"), and (3) the derivative of the error signal times the derivative gain factor ("D-gain"). This last additive part, D-gain, for practical reasons, may alternatively be a derivative of the feedback signal as will be described times a derivative gain factor. Henceforth, these two sources of the derivative signal will be treated as equivalent and used interchangeably.

The outputs of the P, I and D blocks 38 are summed to produce the outputs of the PID control block 34 and 36. For the PID control block 34, the reference signal $P_r$ will be a desired position of the piston 20 and its actuator arm 24 and as is compared against a position feedback signal $P_f$ fed back from a position transducer 40 connected to the actuator arm 24 and indicated as signal $P_f$. The difference between these two signals per conventional feedback control provides a position error processed by the PID control block 34 to produce position output $P_o$ such as would be normally provided directly to the valve assembly 14. In this case however, the signal $P_o$ is provided to a fuzzy logic block 42 which will be described below in greater detail. The values of the P, I and D gains for the PID control block 34 are tuned according to conventional techniques to provide position control of the hydraulic cylinder 12 meeting the various well-known criteria of rapid response, low steady state error and minimized overshoot.

In contrast, PID control block 36 receives a force reference signal $F_r$ indicating a desired force that the hydraulic cylinder 12 will exert against the mass 26. This force signal is compared against a force feedback signal $F_f$ received from a pressure transducer 45 communicating with the hydraulic fluid within the hydraulic cylinder 12. Again a different signal is produced and P, I and D gains apply to produce a force output signal $F_0$ provided to the fuzzy logic block 42. The PID control block 36 is tuned by conventional techniques to provide for desired force control of the hydraulic cylinder 12 according to user-selected criteria.

Generally the $P_0$ and $F_0$ signals will differ during operation of the hydraulic cylinder 12 and must somehow be selected or combined to produce a single control output for actuator 32 of the valve assembly 14. Ideally this combination selection process is dynamic changing according to the operating situation of the hydraulic cylinder 12. Ideally too, the changes between the combinations of $P_0$ and $F_0$ should be without abrupt discontinuity such as would create undesired jerkiness in the movement of the cylinder and stress on its components. In the present invention, this combination is accomplished by fuzzy logic operating according to a set of rules calculated to provide a proper weighting of the outputs $P_0$ and $F_0$.

Figure 2:
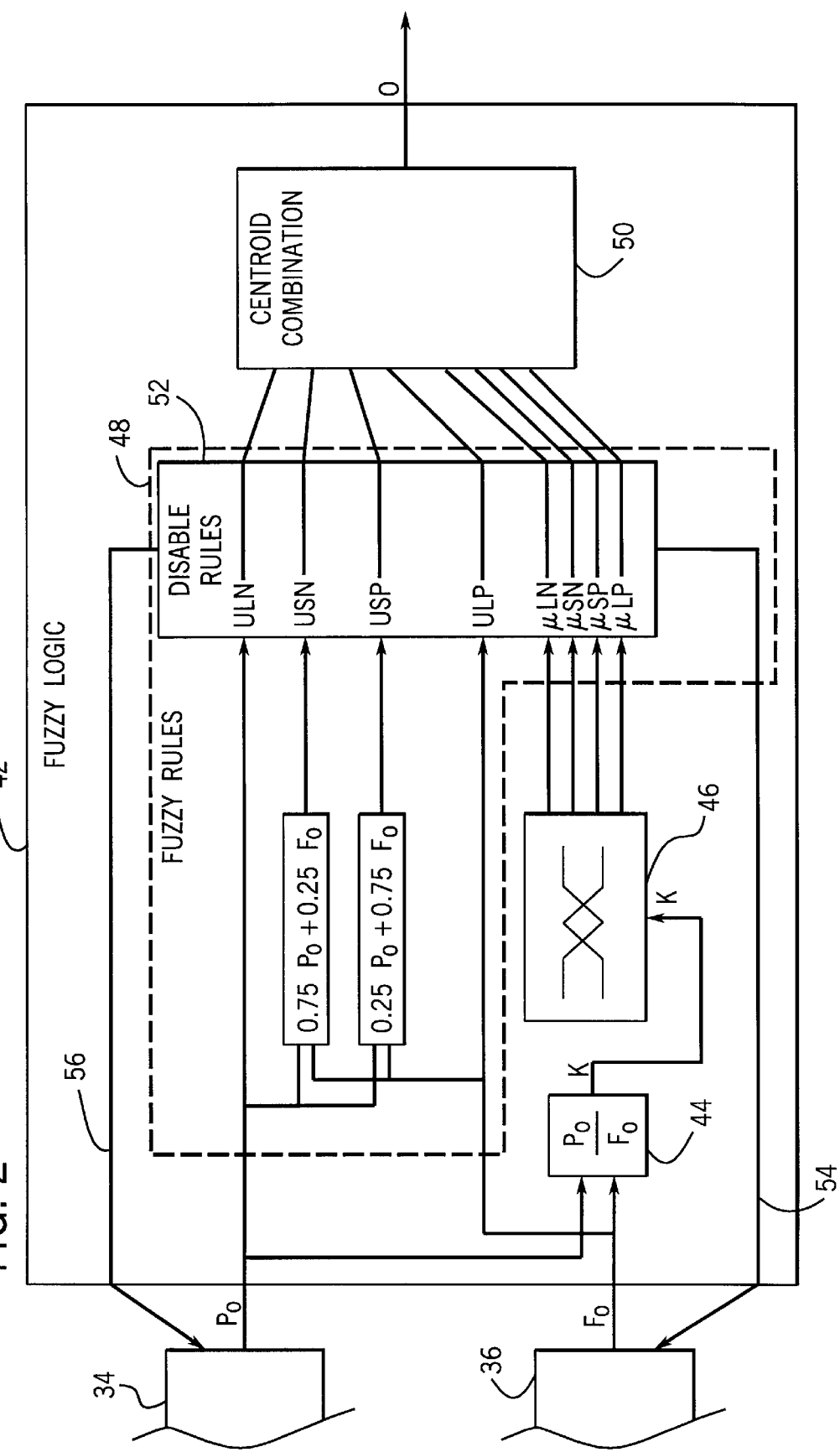
FIG. 2 is a more detailed block diagram of the fuzzy logic unit of the controller of FIG. 1 showing membership categories applied to inputs to the controllers to which rules are applied to produce competing outputs combined to produce a single control output.

Referring now to FIG. 2, the present inventors have adopted a set of fuzzy rules which depend on the relative values of the $P_0$ and $F_0$ signals. Generally as will be seen, greater weight is given to the output signal having a lower magnitude value reflecting a better match of its control tuning to the operating condition of the actuator. For this purpose, the $P_0$ and $F_0$ signals are first formed into a ratio by divider 44 I(i.e., $P_0/F_0$) the value of which provides indication of relative magnitudes of the $P_0$ and $F_0$ signals. The ratio thus formed will henceforth be termed K. The range of K is truncated to 0 to 2.

Next, according to standard fuzzy logic control design, the value of K is converted to one or more fuzzy categories by membership functions 46. The fuzzy categories to be produced are $\mu_{LN}, \mu_{SN}, \mu_{SP}, \mu_{LP}$ corresponding generally to the magnitude of the ratio K.

Figure 3:
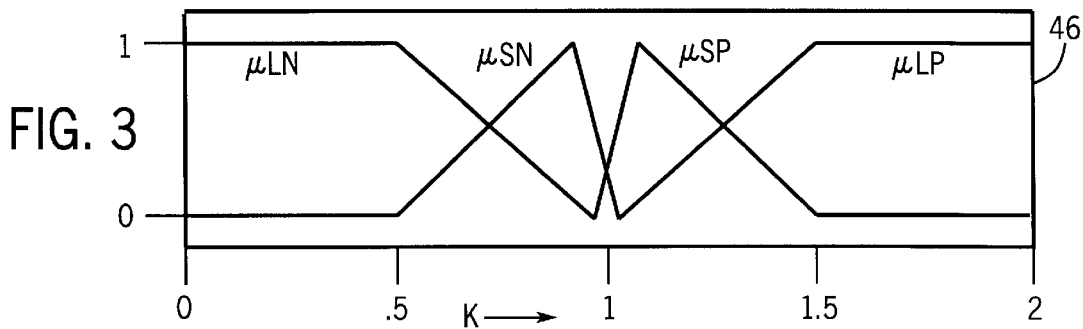
FIG. 3 is a graphical representation of the membership functions of FIG. 2.

Referring now to FIG. 3 in the preferred embodiment, this step of fuzzification uses trapezoidal membership functions for each of these categories $\mu_{LN}, \mu_{SN}, \mu_{SP}, \mu_{LP}$. Specifically, the membership function for $\mu_{LN}$ for arguments of K=0 to 0.5 produces a value of 1 which then decreases linearly for arguments K of 0.5 to 1. At arguments of K greater than 1 a value of 0 is obtained. The fuzzy category $\mu_{LN}$ thus represents a case where $F_0$ is much larger than $P_0$.

The membership function for $\mu_{SN}$ for arguments of K in the range of 0 to 0.5 has a value of 0 which rises linearly for K arguments of 0.5 to 1 reaching a value of 1 then drops abruptly to 0 for arguments K greater than or equal to 1. The membership function $\mu_{SN}$ therefore represents values of $F_0$ somewhat smaller than values of $P_0$.

The membership function lisp is mirror-symmetric with $\mu_{SN}$ about K=1 having a value of 0 for arguments of K between 0 and 1, then rising abruptly to a value of 1 for arguments K just above 1 then dropping linearly to 0 at arguments of K equal to 1.5 or greater. The membership function $\mu_{SP}$ thus represents situations where $P_0$ is somewhat greater than $F_0$.

The membership function $\mu_{LP}$ is mirror-symmetric about K=1 with $\mu_{LN}$ having values of 0 with arguments of K between 0 to 1 then rising linearly for arguments of K from 1 to 1.5 reaching a value of 1 for all arguments of K greater than 1.5. Membership function $\mu_{LP}$ thus represents values of $P_0$ much greater than values of $F_0$.

Each of these values of the membership functions $\mu_{LN}, \mu_{SN}, \mu_{SP}$ and $\mu_{LP}$ are provided to a rule block 48 to be combined according to fuzzy rules as will now be described. The fuzzy rules make use of some additional values derived from the $P_0$ and $F_0$ outputs. The first value, designated $\mu_{LN}$, is simply equal to $P_0$. A second value, $\mu_{SN}$, is equal to a blending of $P_0F_0$ according to the following equation: $\mu_{SN}$= 0.75 $P_0$+0.25 $F_0$. Thus $\mu_{SN}$ is 75% $P_0$ and 25% $F_0$. An additional value $\mu_{SP}$ reverses these ratios according to the following equation: $\mu_{SP}$=0.25 $P_0$+0.75 $F_0$. Finally $\mu_{LP}$=$F_0$. The values $\mu_{LN}, \mu_{SN}, \mu_{SP}$ and $\mu_{LP}$ thus provide a range of different weightings between $P_0$ and $F_0$ as will be used by the rules.

The fuzzy rules are provided in the following table:

TABLE I

| |
| --- |
| If K = $_{LN}$ then O = $u_{LN}$ |
| If K = $_{SN}$ then O = $u_{SN}$ |
| If K = $_{SP}$ then O = $u_{SP}$ |
| If K = $_{LP}$ then O = $u_{LP}$ |

These fuzzy rules will thus produce a number of competing output values 0 as a result of the general overlap between fuzzy categories provided by the membership functions 46. Accordingly the competing outputs must be combined and this is performed by a centroid combination technique well-known in the art provided by combiner 50 according to the following equation:

$$O = {}_{LN}\mu_{LN}+\mu_{SN}u_{SN}+\mu_{SP}u_{SP}+\mu_{LP}u_{LP}/(\mu_{LN}+\mu_{SN}+\mu_{SP}+\mu_{LP}).$$

It will be recognized that the above equation simply finds a center of mass of the competing outputs. This value 0 is provided to the actuator 32.

An additional set of disable rules 52 is applied to the fuzzy categories so as to prevent windup of the PID control block 34 and 36. Specifically if the value of $\mu_{LP}$ is less than 1 (such as may occur if K is less than 1.5), then a disable signal 54 is generated connecting to PID control block 36 to deactivate the integral term on that PID controller. This reflects a situation where the output of the PID control block 36 is underrepresented in the final output O and thus there is a danger that the error term provided to the integral block of PID control block 36 will remain high indefinitely. This increase in the integral term is known as windup and will create a discontinuity if the value of $F_0$ is once again incorporated into the value of O. Accordingly the integrator is disabled to stop integrating under this circumstance. Correspondingly if $\mu_{LN}$ is less than 1, a disable signal 56 is produced connected to PID control block 34 to disable that integration block for similar reasons.

Figure 4:
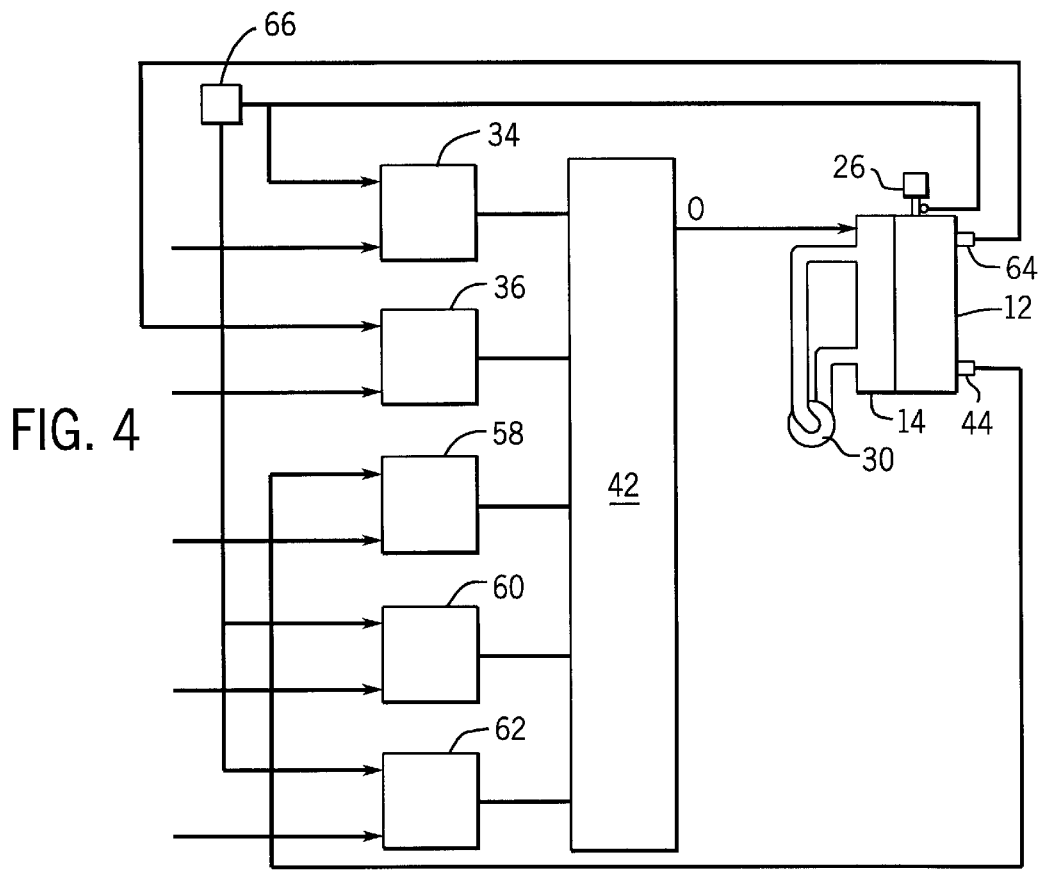
FIG. 4 is a figure similar to that of FIG. 1 showing multiple feedback controllers as may be used in a more complex implementation of the invention.

Referring now to FIG. 4, the present invention is not limited to PID control blocks 34 and 36 but may include other PID control blocks 58, 60 and 62 and may be generalized to an arbitrary number of control blocks (which may or may not be PID controllers) whose outputs are integrated by fuzzy logic block 42. For example, PID control block 58 may be a negative force controller, taking a feedback signal from a second force sensor 64 on the upper side of the piston 20 so as to control a retraction force. PID control blocks 60 and 62 may, for example, be velocity controllers using a derivative of the position signal provided by differential block 66 to control velocity of the hydraulic cylinder 12. Likewise, all of the PID control blocks 34, 36, 58, 60 and 62 may look at the same controlled quantity (e.g., velocity or pressure) but be tuned for different goals such as low steady state error, low overshoot or fast response time. A similar set of rules may be used as described above, expanded as will be understood by those of ordinary skill in the art to an N-dimensional rather than two-dimensional case as shown in FIG. 3.

Figure 5:
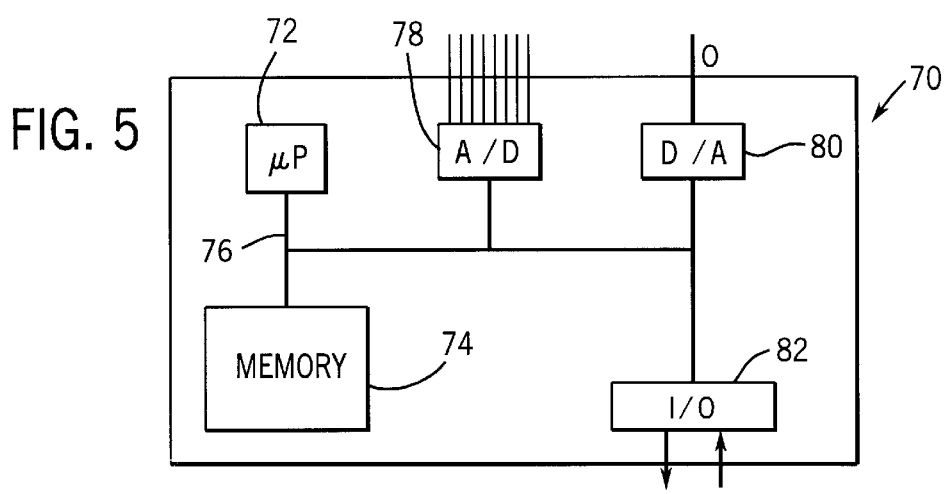
FIG. 5 is a schematic representation of an electronic computer such as may be used to implement the elements of the feedback controllers and the fuzzy logic block of FIG. 1.

Referring now to FIG. 5, it will be understood that the control system 16 may be implemented in a variety of forms including discrete circuitry but preferentially is embodied as one or more of software routines running on an electronic computer 70. The electronic computer has a processor 72 communicating with a memory 74 via an internal bus 76. An A to D converter 78 may receive the various control signals $P_r$, $F_r$, and feedback signals $P_r$, $F_f$ and the like and a D to A converter 80 may provide the output signal O. Both the A to D converter 78 and D to A converter 80 are also connected on the internal bus 76 and joined with an I/O block 82 which may communicate with a keyboard and terminal (not shown) for tuning of the various parameters P, I and D of the PID control blocks 34 through 62 by an operator.

The above description has been that of a preferred embodiment of the present invention, it will occur to those that practice the art that many modifications may be made without departing from the spirit and scope of the invention. For example, the same principles may be applied to other drives such as electric drives. Clearly too, the present invention may be readily extended to more than two feedback controllers. In order to apprise the public of the various embodiments that may fall within the scope of the invention, the following claims are made.

We claim:

1. A control system for an actuator, the actuator receiving a command signal causing actuation of the actuator and providing at least one feedback signal indicating resultant actuation of the actuator, the control system comprising:
   a first feedback controller receiving a feedback signal and tuned for a first operating condition of the actuator and providing a first output signal;
   a second feedback controller receiving a feedback signal and tuned for a second operating condition of the actuator different from the first operating condition and providing a second output signal; and
   a fuzzy logic circuit receiving the first and second output signals to:
   (i) generate an output K indicating a relative magnitude of the first and second output signals;
   (ii) evaluate K according to at least two fuzzy categories indicating the relative magnitude of the first and second output signals;
   (iii) apply rules to the fuzzy categories providing less weighting to one of the first and second output signals having greater relative magnitude to produce fuzzy output values; and
   (iv) combine the fuzzy output values to a single control output to the actuator.

2. The control system of claim 1 wherein the first and second feedback controllers and the fuzzy logic are implemented in software executed on an electronic computer.

3. The control system of claim 1, wherein the first and second feedback controllesr are selected from the group consisting of: position feedback controllers, force feedback controllers and velocity feedback controllers.

4. The control system of claim 1, wherein the fuzzy logic circuit forms the outputs of the first and second feedback controllers into a ratio and wherein the combination of the first and second outputs is a function of that ratio.

5. The control system of claim 1 wherein the fuzzy logic circuit combines the first and second outputs so that the lesser of the first and second outputs has the greater weight of the combination.

6. The control system of claim 1 wherein the first feedback controller and the second feedback controller are proportional-integral-derivative controllers and wherein the fuzzy logic rules disable the integral portion of a given feedback controller when the contribution of the output o the given feedback controller is less than a predetermined amount of the command signal.

7. The control system of claim 1 including a function block combining the outputs of the first and second feedback controllers and providing the combined outputs to the fuzzy logic circuit and wherein the fuzzy logic circuit receives and combines the first and second output signals and the combined outputs according to fuzzy logic rules to produce the control output to the actuator.

8. A control system for an actuator, the actuator receiving a command signal causing actuation of the actuator and providing at least one feedback signal indicating resultant actuation of the actuator, the control system comprising:
   a first feedback controller receiving a feedback signal and tuned for a first operating condition of the actuator and providing a first output signal;
   a second feedback controller receiving a feedback signal and tuned for a second operating condition of the actuator different from the first operating condition and providing a second output signal; and
   a fuzzy logic circuit receiving and combining the first and second output signals according to fuzzy logic rules to produce the control output to the actuator, wherein the fuzzy logic circuit forms the outputs of the first and second into a ratio and wherein the combination of the first and second outputs is a function of that ratio.

9. A control system for an actuator, the actuator receiving a command signal causing actuation of the actuator and providing at least one feedback signal indicating resultant actuation of the actuator, the control system comprising:
   a first feedback controller receiving a feedback signal and tuned for a first operating condition of the actuator and providing a first output signal;
   a second feedback controller receiving a feedback signal and tuned for a second operating condition of the actuator different from the first operating condition and providing a second output signal; and
   a fuzzy logic circuit receiving and combining the first and second output signals according to fuzzy logic rules to produce the control output to the actuator, wherein the fuzzy logic circuit combines the first and second outputs so that the lesser of the first and second outputs has the greater weight of the combination.

* * * * *